(12) United States Patent
Mortzheim et al.

(10) Patent No.: US 9,086,164 B2
(45) Date of Patent: Jul. 21, 2015

(54) APPARATUS AND METHOD OF DELIVERING A FLUID USING A NON-MECHANICAL EDUCTOR PUMP AND LOCK HOPPER

(75) Inventors: Jason Paul Mortzheim, Gloversville, NY (US); Farshad Ghasripoor, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 399 days.

(21) Appl. No.: 13/537,511

(22) Filed: Jun. 29, 2012

(65) Prior Publication Data

US 2014/0000720 A1    Jan. 2, 2014

(51) Int. Cl.
  *B65G 51/18*    (2006.01)
  *F16K 24/00*    (2006.01)

(52) U.S. Cl.
  CPC ....................................... *F16K 24/00* (2013.01)

(58) Field of Classification Search
  USPC ............... 406/56, 60, 92, 131, 144, 146, 194, 406/195, 197
  See application file for complete search history.

(56) References Cited

U.S. PATENT DOCUMENTS

| | | | | |
|---|---|---|---|---|
| 847,270 | A * | 3/1907 | Wise | 451/87 |
| 1,462,296 | A * | 7/1923 | Moore et al. | 451/99 |
| 1,858,561 | A * | 5/1932 | Ruemelin | 451/99 |
| 2,326,438 | A * | 8/1943 | Clarke | 208/153 |
| 2,524,919 | A * | 10/1950 | Meincke | 406/34 |
| 2,608,446 | A * | 8/1952 | La Pota | 406/144 |
| 2,734,782 | A * | 2/1956 | Galle | 406/132 |
| 2,817,561 | A * | 12/1957 | Planiol | 406/132 |
| 2,889,174 | A * | 6/1959 | Schwing | 406/92 |
| 2,919,159 | A * | 12/1959 | Lacroix | 406/137 |
| 3,345,111 | A * | 10/1967 | Bies et al. | 406/138 |
| 3,389,938 | A * | 6/1968 | Frazier | 406/14 |
| 3,708,208 | A * | 1/1973 | Fuss | 406/144 |
| 4,019,783 | A * | 4/1977 | Kayser | 406/144 |
| 4,451,184 | A | 5/1984 | Mitchell | |
| 5,018,910 | A * | 5/1991 | Weiss | 406/144 |
| 5,494,381 | A * | 2/1996 | Heyl et al. | 406/14 |
| 6,012,875 | A * | 1/2000 | Goettelmann et al. | 406/144 |
| 6,619,889 | B1 * | 9/2003 | Sinker et al. | 406/92 |
| 6,821,060 | B2 * | 11/2004 | McTurk et al. | 406/137 |
| 6,892,909 | B1 * | 5/2005 | Hebert et al. | 222/637 |

(Continued)

OTHER PUBLICATIONS

Kenneth M. Sprouse, "PWR Biomass IGCC Economic Analysis", Interim Topical Report, Issue Date: Nov. 30, 2010.

*Primary Examiner* — Joseph Dillon, Jr.
(74) *Attorney, Agent, or Firm* — Andrew J. Caruso

(57) ABSTRACT

An apparatus and method for delivering a fluid using non-mechanical lock hopper eductor assembly. The assembly including at least one lock hopper coupled to an eductor motive fluid inlet, a source of a treatment material and a suction flow outlet. The lock hopper configured to contain therein a pressurized treatment fluid as an output suction flow. The lock hopper is coupled to an eductor pump assembly. The eductor pump assembly including a suction chamber in fluidic communication with the eductor motive fluid inlet, the suction flow outlet and a fluid mixture outlet. The suction chamber configured to output a fluid mixture to a mixing chamber coupled to said fluid mixture outlet and configured to mix the fluid mixture therein. The eductor pump assembly further including an expansion feature coupled to said mixing chamber and configured to expand the fluid mixture therein for delivery to a downstream component.

20 Claims, 4 Drawing Sheets

(56) References Cited

U.S. PATENT DOCUMENTS

| | | |
|---|---|---|
| 7,241,080 B2 * | 7/2007 | Klobucar et al. ............... 406/50 |
| 7,311,474 B1 * | 12/2007 | Ogasahara et al. ........... 406/143 |
| 7,621,329 B1 | 11/2009 | Case et al. |
| 7,845,413 B2 | 12/2010 | Shampine et al. |
| 8,006,613 B2 * | 8/2011 | Stousland et al. .............. 99/361 |
| 8,056,635 B2 | 11/2011 | Shampine et al. |
| 8,747,029 B2 * | 6/2014 | Thorn .......................... 406/197 |
| 2004/0071618 A1 | 4/2004 | Sprouse et al. |
| 2009/0277638 A1 | 11/2009 | Case et al. |
| 2009/0277640 A1 | 11/2009 | Thompson et al. |
| 2009/0281006 A1 | 11/2009 | Walters et al. |
| 2010/0326663 A1 | 12/2010 | Bobier et al. |
| 2011/0139583 A1 | 6/2011 | Bielenberg et al. |
| 2011/0272636 A1 | 11/2011 | Rubin et al. |

* cited by examiner

APPARATUS AND METHOD OF DELIVERING A FLUID USING A NON-MECHANICAL EDUCTOR PUMP AND LOCK HOPPER

BACKGROUND

Embodiments disclosed herein relate generally to an apparatus and method of delivering a fluid into a wellbore.

Hydrofracking, commonly known as fracking, is a technique used to release petroleum, natural gas or other substances for extraction from underground reservoir rock formations. A wellbore, drilled into the reservoir rock formation, and into which treatment fluid is pumped, causes fractures and allows for the release of trapped substances produced from these subterranean natural reservoirs. Current wellhead fracking systems utilize a process wherein the treatment fluid is pre-mixed prior to being pumped to the required wellhead pressure. This means the fracking pumps are handling a treatment fluid mixture that contains sand and/or other abrasives as well as possibly a host of chemical additives. Use of such treatment fluid mixtures has been shown to cause significant deterioration of the fracking pumps, eventually leading to the need for their repair or replacement. This means at each wellhead site a significant number of spare parts or complete spare fracking pumps are required to be on hand to assist in rapid repair and/or switch out to maintain the ability to continue the fracking process. This large number of spare parts and/or complete fracking pumps is a cost carried by the fracking company as well as requiring significant space, where space may be at a premium. In addition, repair and/or replacement delay times are also a loss to the fracking company. The loss of a fracking pump during operation can result in the loss of the entire fracking operation on that section of the well; a significant economic loss to the well developer.

Fracking pumps are typically mechanical based pumps that utilize pumping solids, especially solids such as sand, as well as some chemicals. Mechanical pumps have inherent issues as the solid materials can rapidly damage the mechanical pump components, such as pistons, through abrasion and erosion and the chemicals can corrode the pump materials. Mechanical pumps rely on the motion between two parts that move relative to each other with close tolerances and/or sealing features between the two parts. It is in this boundary where small solids, such as sand, can enter and become trapped. With successive motion, the trapped solid abrades one or both of the two mating parts. In addition as the mechanical pump has mating surfaces that move relative to each other, the choice of materials is limited due to tribology concerns, including friction, lubrication and wear. These tribology concerns may preclude material choices that could withstand chemical attack or erosion. With the use of standard materials in an acceptable pair for tribology, one may not be able to design around erosion, corrosion or have the ability to apply corrosion or erosion resistant coatings. This damage ultimately leads to reduced pressure capability and/or flow rate and when a critical status is reached, the pump requires repair or replacement.

Previous attempts utilized for pumping a treatment fluid at the wellhead of a fracking system have utilized the concept of splitting the wellhead treatment stream into a pure water stream or clean stream (defined as a fluid that does not erode or corrode) and a dirty stream that contains the abrasives and chemical content. Systems utilizing this split wellhead treatment stream are commonly known as split-stream systems. Known split-stream systems utilize conventional mechanical pumps for both the clean stream and to deliver the abrasive/chemical stream. In split-stream systems, there are a number of these mechanical pumps that operate to pump only the clean stream and a second set of pumps that operate with the abrasive/chemical fluid. Due to the fact that there is always a pump that will face the abrasive/chemical stream, the pump will ultimately face the same issue with maintenance penalties. More specifically, in a split-stream system there will remain at least one mechanical pump subjected to the harsh fluid with the associated maintenance penalty, so while the maintenance issue is reduced, it is not solved.

Accordingly, there is a need for an improved pumping system and method for delivering fluid into a wellbore that will reduce wear and tear on the pumping mechanism utilized in the pumping system.

BRIEF SUMMARY OF THE INVENTION

These and other shortcomings of the prior art are addressed by the present disclosure, which provides an apparatus and method of delivering a fluid using a non-mechanical eductor pump and lock hopper.

In accordance with an embodiment, provided is an apparatus for delivering a fluid including a lock hopper coupled to an eductor motive fluid inlet, a source of a treatment material and a suction flow outlet and an eductor pump assembly coupled to said lock hopper. The lock hopper configured to contain therein a pressurized treatment fluid as an output suction flow. The eductor pump assembly comprising: a suction chamber coupled to said lock hopper, the suction chamber in fluidic communication with the eductor motive fluid inlet, the suction flow outlet and a fluid mixture outlet, the suction chamber configured to output a fluid mixture; a mixing chamber coupled to said fluid mixture outlet and configured to mix the fluid mixture therein; and an expansion feature coupled to said mixing chamber and configured to expand the fluid mixture therein for delivery to a downstream component.

In accordance with another embodiment, provided is an apparatus for delivering a fluid including at least one lock hopper eductor assembly comprising: at least one lock hopper coupled to an eductor motive fluid inlet, a source of a treatment material and a suction flow outlet, and at least one eductor pump assembly coupled to said at least one lock hopper. The at least one lock hopper configured to contain therein a pressurized treatment fluid as an output suction flow. The at least one eductor pump assembly comprising: a suction chamber coupled to said at least one lock hopper, the suction chamber in fluidic communication with the eductor motive fluid inlet, the suction flow outlet and a fluid mixture outlet, the suction chamber configured to output a fluid mixture; a mixing chamber coupled to said fluid mixture outlet and configured to mix the fluid mixture therein; and an expansion feature coupled to said mixing chamber and configured to expand the fluid mixture therein for delivery to a downstream component.

In accordance with yet another embodiment, provided is a method for delivering a fluid including filling a lock hopper with a treatment material and a motive fluid; pressurizing the lock hopper to generate a pressurized treatment fluid therein; activating an eductor pump assembly coupled to the lock hopper; inputting the pressurized treatment fluid into a suction chamber of the eductor pump assembly as a fluid mixture; expanding the fluid mixture in an expansion chamber of the eductor pump assembly; and delivering the expanded fluid mixture to a downstream piping.

Other objects and advantages of the present disclosure will become apparent upon reading the following detailed description and the appended claims with reference to the accompanying drawings.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein.

DETAILED DESCRIPTION

The invention will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

Preferred embodiments of the present disclosure are illustrated in the figures with like numerals being used to refer to like and corresponding parts of the various drawings. It is also understood that terms such as "top", "bottom", "outward", "inward", and the like are words of convenience and are not to be construed as limiting terms. It is to be noted that the terms "first," "second," and the like, as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity).

As used herein, the process of forming of a fluid includes mixing or merging two or more fluids or mixing a fluid with a powdered or particulate material, such as a powdered dissolvable or hydratable additive (prior to hydration) or proppant. In a continuous treatment or in a continuous part of a well treatment, the fluids are handled as fluid streams. In addition, as used herein the terms injector pump, eductor pump or eductor-jet pump are intended to refer to a type of pump that uses a one of a converging or converging-diverging nozzle and the Venturi effect to decrease the pressure energy and increase the velocity energy of a motive fluid passing therethrough, and thereby creating a low pressure zone that draws in and entrains a fluid.

Figure 1:
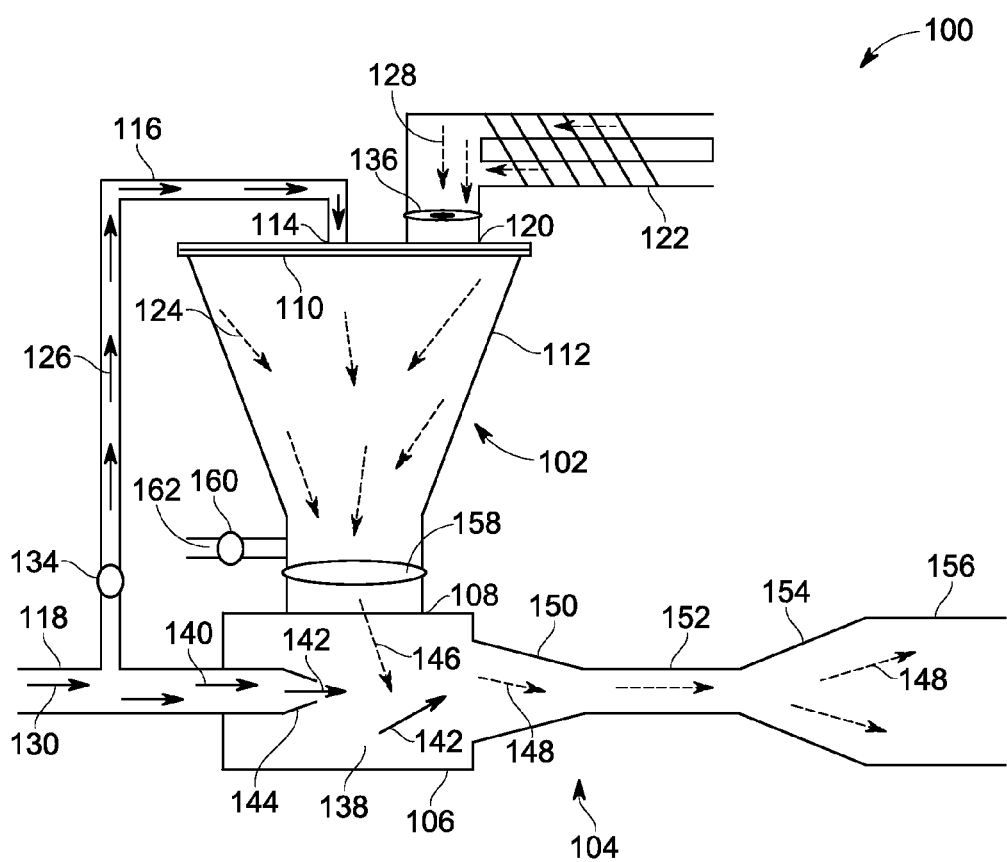
FIG. 1 is a schematic diagram of an apparatus for delivering a fluid using a non-mechanical lock hopper eductor pump assembly constructed in accordance with an embodiment.

Referring to the drawings wherein, as previously stated, identical reference numerals denote the same elements throughout the various views, FIG. 1 depicts in a simplified block diagram, elements of a lock hopper eductor pump assembly or apparatus 100 for delivering a fluid including a non-mechanical pump in a well bore, according to an embodiment. The apparatus 100 includes a lock hopper 102 coupled to an eductor pump assembly 104, including an eductor body 106. The lock hopper 102 is coupled to the eductor body 106, at a suction port 108 of the eductor body 106. The lock hopper 102 is configured as a traditional hopper and includes a hopper body 112 configured to hold a pressurized treatment fluid (described presently) therein and a pressurized motive fluid inlet 114 in fluidic communication via a conduit 116 with an eductor motive fluid inlet 118. The lock hopper 102 further includes a material inlet 120 coupled to a material loading device 122 and a source of treatment material (not shown). In an embodiment, the treatment material may be comprised of a sand, or other abrasive material commonly utilized in pumping operations.

An external cover 110 allows the lock hopper 102 to contain therein a treatment fluid 124, comprised of a first portion of a motive fluid 126 and a treatment material 128, under pressurized conditions. In an embodiment, the first portion of a motive fluid 126 may be a portion of an eductor motive fluid 130 input at an eductor motive fluid inlet 118. The input of the first portion of a motive fluid 126 may be metered by a valve mechanism 134 disposed in the conduit 116 and fed to the lock hopper via the conduit 116. During operation, the lock hopper 102 is loaded by the material loading device 122, such as a screw auger, conveyor, or any other low pressure means configured to move the treatment material 128 from its storage facility (not shown) to the lock hopper 102. The material loading device 122 is sealed from the lock hopper 102 when under pressure via a valve mechanism 136, such as a butterfly valve, or the like.

The eductor pump assembly 104 includes the eductor body 106, and more particularly a suction chamber 138 that is driven by a second portion of a motive fluid 140 as a motive flow 142. The second portion of the motive fluid 140, comprised of the eductor motive fluid 130, is input at an eductor motive fluid inlet 118 and accelerated through a first nozzle 144. As with traditional eductors, accelerating a higher pressure fluid through the first nozzle 144 drops the static pressure of a motive flow 142 exiting through the first nozzle 144, while simultaneously decreasing the static pressure within the suction chamber 138. The lower suction pressure in the suction chamber 138 draws in the pressurized treatment fluid 124, including the treatment material 128, as a suction flow 146 via the suction port 108 of the lock hopper 102. Subsequently, a fluid mixture 148, comprised of a combination of the motive flow 142 and the suction flow 146, is delivered to a second nozzle 150 prior to reaching a mixing chamber 152. Within the mixing chamber 152 the fluid mixture 148, comprised of the motive flow 142 and the suction flow 146, is further mixed as the stratifications between the two fluids is allowed to settle out and as the turbulent fluid structure is reduced. The fluid mixture 148 exiting the mixing chamber 152 is expanded in an expansion feature 154, prior to being delivered to downstream piping 156, that may ultimately be in fluidic communication with a wellhead. The expansion feature 154 provides an expansion of the fluid mixture 148 and provides a decrease in the velocity of the fluid mixture 148 and recovery of the pressure of the fluid mixture 148 allowing the fluid to be delivered against a pressure head greater than that of the suction port 108.

During operation of the apparatus 100, and more particularly the lock hopper eductor pump assembly, comprised of the eductor pump assembly 104 and the lock hopper 102, when the devices are not under pressure, the lock hopper 102 is filled through material loading device 122. Subsequent to the lock hopper 102 being filled with the treatment material 128 via the valve mechanism 136 and material inlet 120, the valve mechanism 136 is closed. The eductor pump assembly 104 is next placed in operation by pressurizing the suction chamber 140 and lock hopper 102, simultaneously. Subsequent to the appropriate pressure conditions being reached, a valve mechanism or gate, 158, disposed between the lock hopper 102 and suction port 108 may be opened to allow the lock hopper 102 contents to enter the eductor pump assembly 104, and more particularly the suction chamber 138. More specifically, the suction chamber 138 draws in the pressurized treatment fluid 124, including the treatment material 128, as the suction flow 146, and subsequently mixes with the motive flow 142. Operation continues in this manner until the lock hopper 102 contents, and more particularly the treatment fluid 124, are expended. At this time the valve mechanism, or gate, 158 can be closed and the pressure in the lock hopper 102 relieved through a valve mechanism 160 disposed in a discharge conduit 162. The discharge conduit 162 is preferably directed to a collecting chamber (not shown) on site.

It should be noted that valve mechanism 158 is optional, being required in an application where the desire is to allow the eductor pump assembly 104 to remain at full pressure. As valves in the direct path of the treatment fluid 124, and more particularly treatment material 128, will be subject to a harsh abrasive environment, it is realized that valve mechanism 158 will be subject to higher wear rates. As such, an embodiment eliminating the valve mechanism 158 is anticipated, therefore allowing the eductor pump assembly 104 to be isolated so that the entire eductor pump assembly 104 and lock hopper 102 have the pressure released to allow low pressure feeding to commence through material loading device 122.

In an embodiment, the valve mechanism 158 is a butterfly valve with an opening in the direction of flow, as indicated by arrows. When the lock hopper 102 is emptying, the last of the treatment material 128 is washed from the open valve surfaces by the pressurizing fluid, and more particularly the first portion of the motive fluid 126, thereby allowing the valve mechanism 158 to close with minimal treatment material 128 present to wear upon the valve components.

In an embodiment, the apparatus 100 utilizes an eductor pump assembly 104 that allows the treatment material 128, such as sand and/or chemicals, to be mixed with a stream of pure fluid as the motive fluid 126, namely water but could be any fluid available at high pressures and used in the downstream process. The eductor pump assembly 104 operates as a non-mechanical pumping and mixing device that has no moving parts and therefore requires no sealing with tight tolerances. In addition, as is created by standard turning operations with the key requirements to maintain large flow path areas under high pressure conditions, it is much more cost effective to manufacture from advanced materials and, if required, to have erosion or corrosion resistant coatings applied. Unlike mechanical pumps, tribology concerns during operation that can prevent the use of advanced materials and coatings are of minimal concern. The eductor pump assembly 104 as disclosed operates as essentially a mixing device. In this regard, the eductor pump assembly 104 is mixing the stream containing the abrasive/chemical mixture, and more specifically the treatment fluid 124, with a clean fluid stream, and more particularly the motive flow 142. In essence, pumping occurs with a clean fluid stream, utilizing conventional pumping methods without a maintenance penalty.

Figure 2:
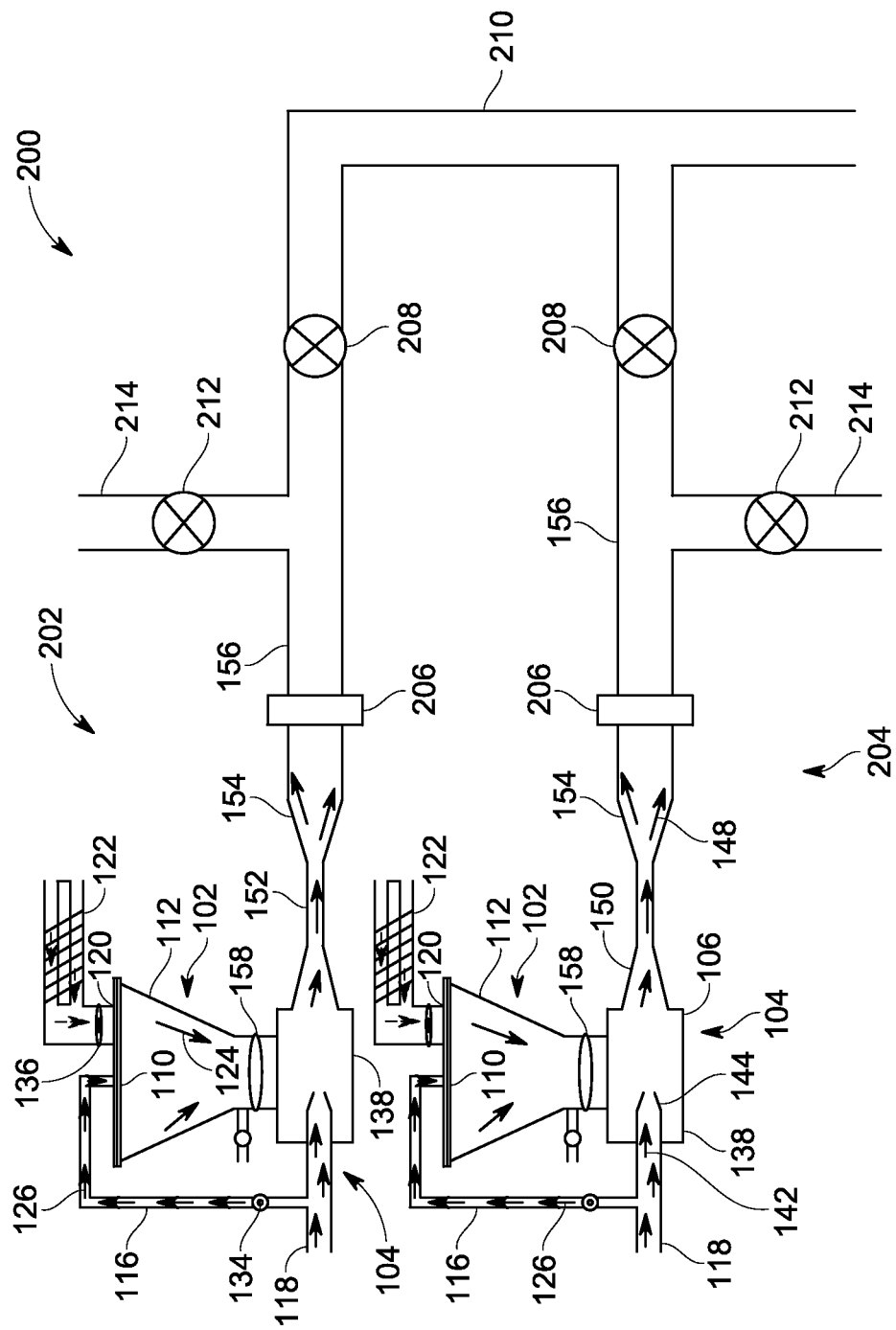
FIG. 2 is a schematic diagram of an apparatus for delivering a fluid using a non-mechanical lock hopper eductor pump assembly constructed in accordance with another embodiment.
Figure 3:
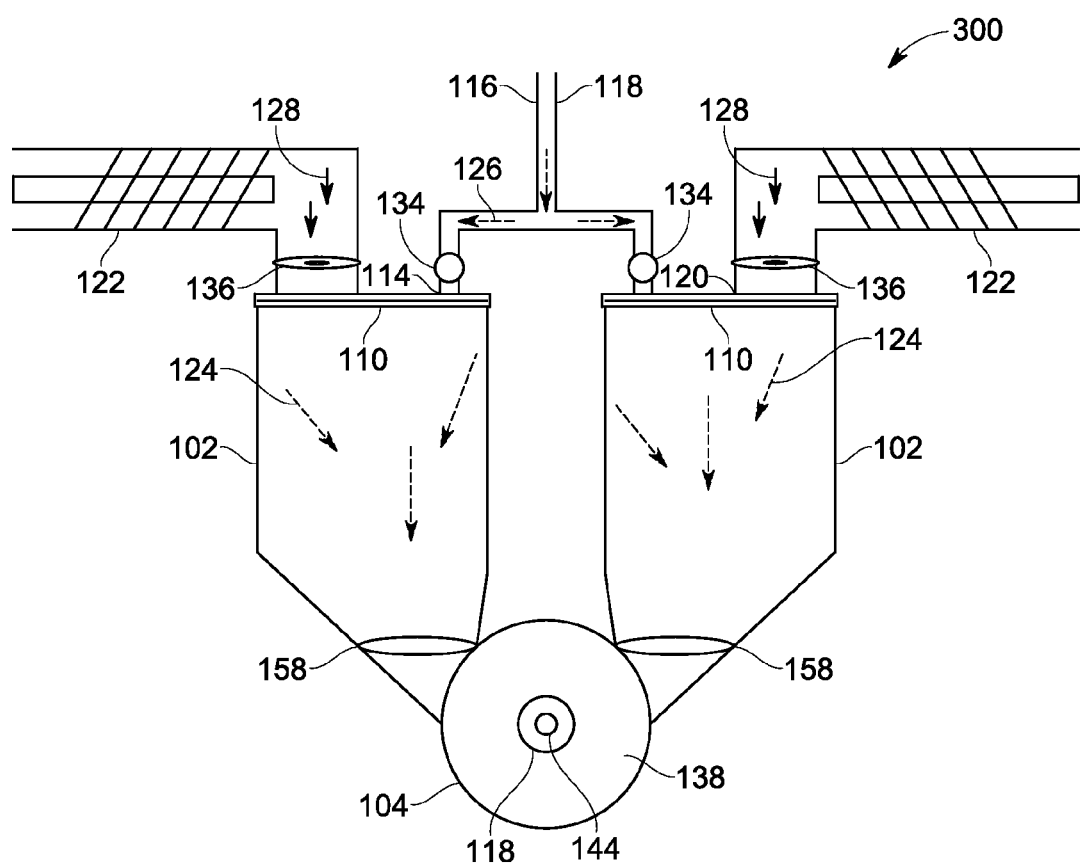
FIG. 3 is a schematic diagram of an apparatus for delivering a fluid using a non-mechanical lock hopper eductor pump assembly constructed in accordance with still another embodiment.

Further embodiments of an apparatus for delivering a fluid using a non-mechanical eductor pump and lock hopper are illustrated in FIGS. 2 and 3. Each of the embodiments of FIGS. 2 and 3 addresses an issue of depressurization in lock hoppers as they require depressurization for filling that may result in a disruption of the flow of the well head fluid either in quantity or quality.

Referring more particularly to FIG. 2, illustrated is an apparatus 200, generally comprised of a first lock hopper eductor assembly 202 and a second lock hopper eductor assembly 204 configured in a parallel arrangement. It should be noted that in FIG. 2, only two lock hopper eductor assemblies are shown to illustrate the general idea, however, any number of lock hopper eductor assemblies can be arranged in parallel in order to meet flow delivery and quality desires. As illustrated, each of the first lock hopper eductor assembly 202 and the second lock hopper assembly 204 is generally comprised of a lock hopper 102 coupled to an eductor pump assembly 104, including an eductor body 106. The lock hopper 102 is coupled to the eductor pump assembly 104, at a suction port of the eductor body 106 (generally similar to, and as best illustrated in FIG. 1). The lock hopper 102 includes a hopper body 112 configured for pressurization. Similar to the previous disclosed embodiment, and as shown in FIG. 1, each of the lock hopper eductor assemblies 202 and 204 includes a pressurized motive fluid inlet in fluidic communication via a conduit 116 with an eductor motive fluid inlet 118. Each of the lock hoppers 102 further includes a material inlet 120 coupled to a material loading device 122 and a source of material (not shown). An external cover 110 allows the lock hopper 102 to contain therein a treatment fluid under pressure, comprised of a first portion of a motive fluid 126 and a treatment material 128 under pressurized conditions. In an embodiment, the first portion of a motive fluid 126 is input at an eductor motive fluid inlet 118, may be metered by a valve mechanism 134 and fed to the lock hopper via conduit 116. The material loading device 122 is sealed from the lock hopper 102 when under pressure via valve mechanism 136, such as a butterfly valve, or the like.

Each of the eductor/inductor pumps 104 includes a suction chamber 138 that is driven by a second portion of a motive fluid as a motive flow 142 input at an eductor inlet 118 and accelerated through a first nozzle 144. As previously described, accelerating a higher pressure fluid through the first nozzle 144 drops the static pressure of a motive flow exiting the first nozzle 144, while simultaneously decreasing the static pressure within the suction chamber 138. The lower suction pressure in the suction chamber 138 draws in the pressurized treatment fluid 124, including the treatment material, as a suction flow via the suction port of the lock hopper 102. Subsequently, a fluid mixture 148, comprised of a combination of the motive flow and the suction flow, is delivered to a second nozzle 150 prior to reaching a mixing chamber 152. The fluid mixture 148 exiting the mixing chamber 152 is expanded in an expansion feature 154, prior to reaching a fluid measuring device 206 and being deliver to downstream piping 156.

In the embodiment described and shown in FIG. 2, the parallel configuration provides that the fluid measuring device 206 are optional devices that allow the well head operator to measure the quantity of the fluid stream 148 exiting each of the lock hopper eductor assemblies 202 and 204. Each of the fluid measuring devices 206 may be used to determine when an assembly, such as assembly 202 or 204 should be closed for refilling or to meter between the plurality of lock hopper eductor assemblies, 202, 204, thereby indicating when one needs to be refilled. The inclusion of the fluid measuring devices 206 allows the process operator to maintain a suitable delivery of material throughout the operation. The control between the two lock hopper eductor assemblies 202, 204 is managed by a plurality of valve mechanisms 208, each disposed in the downstream piping 156, and downstream of the fluid measuring devices 206. The valve mechanisms 208 allow each individual lock hopper eductor assembly 202, 204 to be shut-off from a main delivery stream 210 that leads to the downstream well head entrance. A plurality of optional valve mechanisms 212 disposed in the downstream piping 156, allows the fluid mixture 148 exiting each of the lock hopper eductor assemblies 202, 204 to be diverted through a conduit 214 to a collection tank (not shown). The inclusion of valve mechanisms 208 and 212 in the downstream piping 156 provides isolation of each of the lock hopper eductor assemblies 202, 204 and allows each of the lock hopper eductor assemblies 202, 204 to be depressurized for the purpose of refilling each of the lock hoppers 102 in their respective assemblies 202, 204. This ability to control depressurization of the assemblies 202, 204 may eliminate the need for depressurization valves, such as valve mechanism 160 and/or the lock hopper valve mechanism 158 of FIG. 1.

Referring now to FIG. 3, illustrated is another embodiment of an apparatus for delivering a fluid using a non-mechanical eductor pump and lock hopper, generally referenced 300. Similar to the embodiment disclosed in FIG. 2, this particular embodiment addresses the issue of depressurization in lock hoppers for the purpose of filling that may result in a disruption of the flow of the well head fluid either in quantity or quality. Illustrated in FIG. 3 is a sectional plan view of the lock hopper eductor assembly 300 according to an embodiment. In this embodiment, the lock hopper eductor assembly 300 includes two lock hoppers 102, coupled to a single eductor pump assembly 104.

In an embodiment, each of the two lock hoppers 102 is coupled to a single suction chamber 138 of the eductor pump assembly 104 wherein a suction force is created by a motive flow via an eductor motive fluid inlet 118 that is accelerated through a nozzle 144. Each of the lock hoppers 102 is configured similar to the lock hopper 102 of FIG. 1. More specifically, each lock hopper 102 includes a valve mechanism 158 to close-off the lock hopper 102 from the eductor pump assembly 104.

Similar to the previous disclosed embodiments, each of the lock hoppers 102 includes a pressurized motive fluid inlet 114 in fluidic communication via a conduit 116 with an eductor motive fluid inlet 118. Each of the lock hoppers 102 further includes a material inlet 120 coupled to a material loading device 122 and a source of treatment material (not shown). During operation, a treatment material 128 is fed into a respective lock hopper 102 via the material loading device 122, utilizing an associated valve mechanism 136. Each of the valve mechanism 136 serves to close off the feed mechanism, and more particularly, the material loading device 122. Each lock hopper 102 includes an external cover 110 that allows the lock hoppers 102 to each contain therein a treatment fluid 124 under pressure. The treatment fluid 124 is generally comprised of a first portion of a motive fluid 126 and a treatment material 128 under pressurized conditions. In an embodiment, the first portion of a motive fluid 126 is input at an eductor motive fluid inlet 118, may be metered by a valve mechanism 134 and fed to the lock hopper via conduit 116. In the embodiment illustrated in FIG. 3, the conduit 116 is illustrated as a common conduit for the input of the motive fluid 126 into each of the lock hoppers 120, but in an alternative embodiment may be configured as multiple conduits providing for the input into each lock hopper 102.

In the embodiment illustrated in FIG. 3, the valve mechanism 158 disposed within each of the lock hoppers 102 is no longer optional, as described in the previous embodiments, as the valve mechanisms 158 are required to close off each of the lock hoppers 102 from the eductor pump assembly 104 while it is being loaded from its respective material loading device 122. However, in an alternate embodiment, a single material loading device may be incorporated and designed so that it can access both lock hoppers 102 through their respective valve mechanisms 136. An example of a single material loading device would incorporate a screw or conveyor belt on a swinging pivot.

During operation, one lock hopper 102 would be opened through valve mechanism 158, thereby feeding treatment fluid 124 into the eductor pump assembly 104, while the other lock hopper 102 would be closed off by its valve mechanism 158. While the valve mechanism 158 is closed, its respective lock hopper 102 would be depressurized and reloaded. Once one of the plurality of lock hoppers 102 was emptied, the other lock hopper valve mechanism 158 would be opened to feed the eductor pump assembly 104 while the respective valve mechanism 158 on the empty lock hopper 102 is closed. This process would be repeated to create the delivery of a steady stream of treatment fluid 124 into the eductor pump assembly 104.

Figure 4:
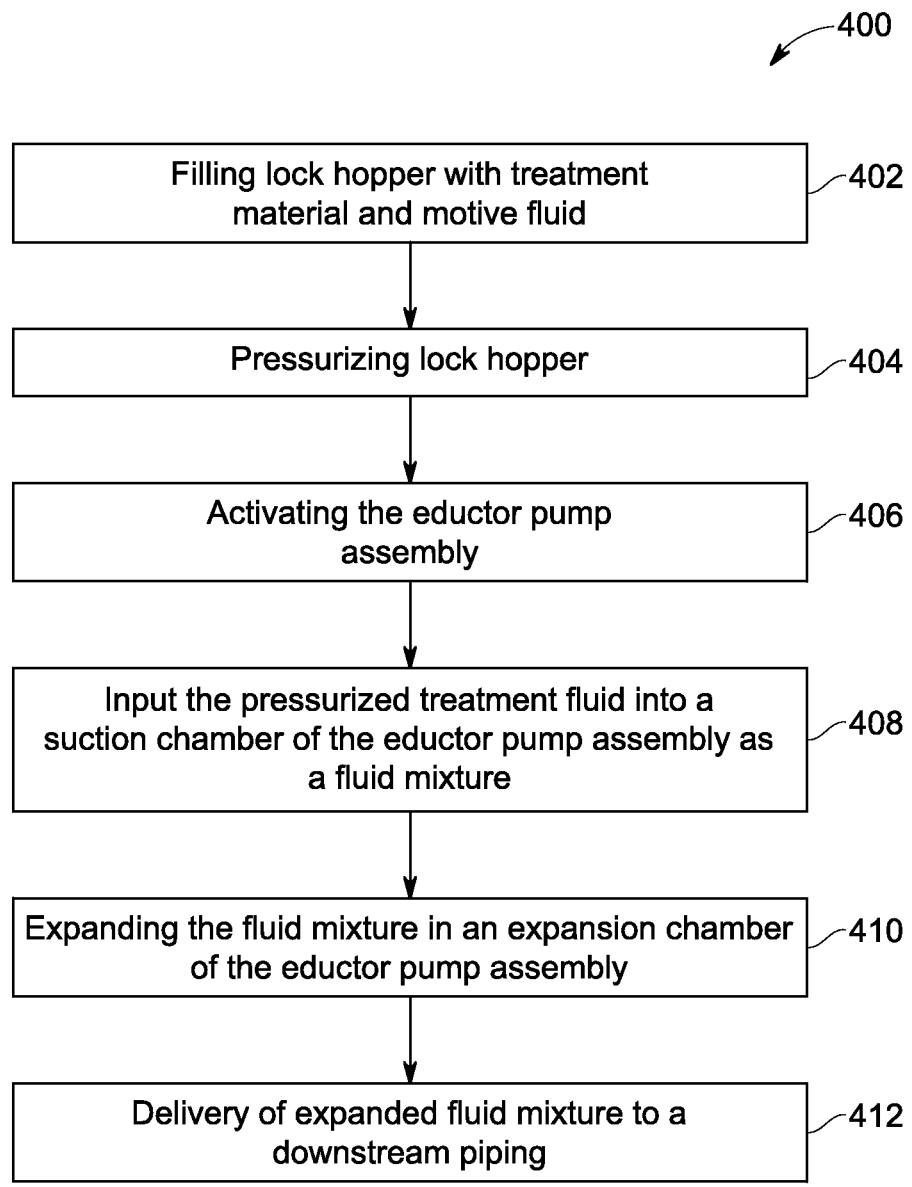
FIG. 4 is a schematic block diagram of a method of delivering a fluid using a non-mechanical lock hopper eductor pump assembly constructed in accordance with an embodiment.

FIG. 4 is a schematic block diagram of a method 400 of delivering a fluid using a non-mechanical eductor pump and lock hopper assembly 100, 200, 300 according to an embodiment disclosed herein. Generally, the method involves filling a lock hopper 102 with a treatment material 128 and a motive fluid 126, at a step 402. Next in step 404, the lock hopper 102 is pressurized generating a pressurized treatment fluid 124 therein. In step 406, the eductor pump assembly 104 is started. As previously described, the lock hopper eductor pump assembly 104 may be configured to include a single lock hopper 102 coupled to a single eductor pump assembly 104 (as best illustrate in FIG. 1), multiple lock hoppers 102 coupled to multiple eductor pump assemblies 103 (as best illustrated in FIG. 2), and/ or as multiple lock hoppers 102 coupled to a single eductor pump assembly 104 (as best illustrated in FIG. 3). Next in step 408, the pressurized treatment fluid 124 in input into a suction chamber 138 of the eductor pump assembly 104 as a fluid mixture 148. In an embodiment, a valve mechanism 158 disposed within the lock hopper 102 at a suction outlet 108 is opened to allow such input of the pressurized treatment fluid 124 into the suction chamber 138. In an alternate embodiment, the valve mechanism 158 is not required. The fluid mixture 148 is next expanded in an expansion chamber 154, at step 410. Subsequently the expanded fluid mixture 148 is delivered to downstream piping 156, at a step 412, and ultimately may include delivery to a well head.

Commercial advantages of the disclosed apparatus and method of delivering a fluid using a non-mechanical eductor pump and lock hopper are focused on the increased reliability of the pumping system. The harsh abrasive/chemical mixtures will be delegated to the non-mechanical mixing in the lock hopper eductor pump assembly that is significantly more tolerant of the nature of the aggressive fluid. The eductor pump assembly is stated to be substantially maintenance free although in true practice some minimum level of maintenance may be required, but significantly improved over known mechanical pumps. In addition, the replacement or overhaul of the lock hopper eductor pump assembly will have significant cost and cycle advantages over a mechanical pump due to its simple design and construction Due to the simple nature of the apparatus as disclosed herein, the use of advanced materials and/or coatings may be easily applied. Most of the components utilized in the apparatus are simple turned structures. Some configurations may utilize welding for more economical construction. In contrast to known mechanical pumps, which by nature of their moving parts, have a further requirement of wear between the moving and stationary parts which will prohibit some materials and/or material combinations and coatings. The apparatus and method of delivering a fluid using a non-mechanical eductor pump and lock hopper as disclosed herein incorporates direct mixing in the process. Alternative mechanical apparatus typically require a secondary device, i.e. common header, etc. to mix the components or if natural mixing is used, the uniformity may not meet the desired consistency with concentration variations.

The application of lock hopper eductor pump assemblies at the pressure required to deliver the fluid in some applications, for example use in well development with unconventional gas, appears to be beyond any other known industry applications. Known eductor pump assemblies typical have application ranges up to 600 psi from standard vendors and a few specialty applications appear to have reached pressures of approximately 2,000 psi; however, there is no known application consistent with operation near 10,000 psi. The disclosed apparatus and method of delivering a fluid using a non-mechanical eductor pump and lock hopper provides for use at elevated pressures near 10,000 psi.

Additional commercial advantages of the disclosed apparatus are related to the current problem faced in unconventional gas development and the requirement to pump chemicals and a proppant, namely sand. However, the disclosed apparatus and method of delivering a fluid using a non-mechanical eductor pump and lock hopper may extend to other industries that require the pumping of other abrasive, erosive or corrosive substances, for example the pumping of hydrocarbonaceous substances such as coal dust, tar sand, etc. for use in integrated gasification combined cycle (IGCC) or biomass applications.

Accordingly, disclosed is apparatus and method of delivering a fluid using a non-mechanical eductor pump and lock hopper configured to reduce wear and tear on the pumping mechanism utilized in the pumping system. It will be understood that the previous modes of operation described herein are merely examples of proposed operating conditions. What is significant is the apparatus provides for a reduction in the wear and tear on the pumping mechanism when under the influence of a treatment fluid that may include chemicals and a proppant, namely sand.

The foregoing has described an apparatus and method of delivering a fluid using a non-mechanical eductor pump and lock hopper. While the present disclosure has been described with respect to a limited number of embodiments, those skilled in the art, having benefit of this disclosure, will appreciate that other embodiments may be devised which do not depart from the scope of the disclosure as described herein. While the present disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

The invention claimed is:

1. An apparatus for delivering a fluid comprising:
a lock hopper coupled to a pressurized motive fluid inlet in fluidic communication via a conduit with an eductor motive fluid inlet, a treatment material inlet coupled to a material loading device and a source of treatment material and a suction flow outlet, the lock hopper configured to contain therein a pressurized treatment fluid as an output suction flow; and
an eductor pump assembly coupled to said lock hopper and comprising:
a suction chamber coupled to said lock hopper, the suction chamber in fluidic communication with the eductor motive fluid inlet, the suction flow outlet and a fluid mixture outlet, the suction chamber configured to output a fluid mixture;
a mixing chamber coupled to said fluid mixture outlet and configured to mix the fluid mixture therein; and
an expansion feature coupled to said mixing chamber and configured to expand the fluid mixture therein for delivery to a downstream component.

2. The apparatus of claim 1, wherein said lock hopper includes an external cover enabling pressurization of the treatment fluid contained therein.

3. The apparatus of claim 1, further comprising a material loading device valve mechanism operable to provide a stream of treatment material to the lock hopper.

4. The apparatus of claim 1, wherein the lock hopper further includes a valve mechanism operable to provide a stream of pressurized treatment fluid to the eductor pump assembly.

5. The apparatus of claim 1, wherein the lock hopper includes a discharge channel and valve mechanism disposed therein the discharge channel to discharge pressure from within the lock hopper.

6. The apparatus of claim 1, wherein the motive fluid is comprised of a first portion of a motive fluid input into the lock hopper via a conduit and a second portion of a motive fluid input into the suction chamber of the eductor pump assembly via a nozzle.

7. The apparatus of claim 6, wherein the conduit includes a metering valve mechanism disposed therein.

8. An apparatus for delivering a fluid comprising:
at least one lock hopper eductor assembly comprising:
at least one lock hopper coupled to a pressurized motive fluid inlet in fluidic communication via a conduit with an eductor motive fluid inlet, a treatment material inlet coupled to a material loading device and a source of treatment material and a suction flow outlet, the at least one lock hopper configured to contain therein a pressurized treatment fluid as an output suction flow; and
at least one eductor pump assembly coupled to said at least one lock hopper and comprising:
a suction chamber coupled to said at least one lock hopper, the suction chamber in fluidic communication with the eductor motive fluid inlet, the suction flow outlet and a fluid mixture outlet, the suction chamber configured to output a fluid mixture;

a mixing chamber coupled to said fluid mixture outlet and configured to mix the fluid mixture therein; and an expansion feature coupled to said mixing chamber and configured to expand the fluid mixture therein for delivery to a downstream component.

9. The apparatus of claim 8, wherein said lock hopper eductor assembly comprises:
a first lock hopper eductor assembly including a fluid stream outlet;
a second lock hopper eductor assembly including a fluid stream outlet and configured in parallel arrangement with said first lock hopper eductor assembly; and
a main delivery stream conduit coupling the fluid stream outlet of said first lock hopper eductor assembly and the fluid stream outlet of said second lock hopper eductor assembly, the main delivery stream configured for delivery of an output fluid mixture.

10. The apparatus of claim 9, further including a first fluid measuring device disposed between the fluid stream outlet of said first lock hopper eductor assembly and said main delivery stream conduit and a second fluid measuring device disposed between the fluid stream outlet of said second lock hopper eductor assembly and said main delivery stream conduit, each of said first and second fluid measuring devices operable to measure a quantity of the fluid mixture exiting each of the first lock hopper eductor assembly and the second lock hopper eductor assembly.

11. The apparatus of claim 8, wherein said at least one lock hopper eductor assembly comprises:
a first lock hopper;
a second lock hopper; and
an eductor pump assembly coupled to said first lock hopper and said second lock hopper.

12. The apparatus of claim 8, wherein the at least one lock hopper includes an external cover enabling pressurization of the treatment fluid contained therein.

13. The apparatus of claim 8, further comprising a material loading device in communication with said at least one lock hopper and configured to deliver a treatment material to said at least one lock hopper.

14. The apparatus of claim 13, wherein said material loading device is configured to deliver a treatment material to a plurality of lock hoppers.

15. The apparatus of claim 13, wherein the material loading device includes a valve mechanism operable to provide a stream of treatment material to the at least one lock hopper.

16. The apparatus of claim 8, wherein the at least one lock hopper further includes a valve mechanism operable to provide a stream of pressurized treatment fluid to the at least one eductor pump assembly.

17. The apparatus of claim 8, wherein the motive fluid is comprised of a first portion of a motive fluid input into the lock hopper via a conduit and a second portion of a motive fluid input into the suction chamber of the eductor pump assembly via a nozzle.

18. A method of delivering a fluid, comprising:
filling a lock hopper with a treatment material and a motive fluid, wherein the lock hopper is coupled to a pressurized motive fluid inlet in fluidic communication via a conduit with an eductor motive fluid inlet, a treatment material inlet coupled to a material loading device and a source of treatment material, and a suction flow outlet;
pressurizing the lock hopper to generate a pressurized treatment fluid therein;
activating an eductor pump assembly coupled to the lock hopper;
inputting the pressurized treatment fluid into a suction chamber of the eductor pump assembly as a fluid mixture, wherein the suction chamber is in fluidic communication with the eductor motive fluid inlet, the suction flow outlet and a fluid mixture outlet and configured to output a fluid mixture;
mixing the fluid mixture in a mixing chamber coupled to the fluid mixture outlet of the suction chamber;
inputting the mixed fluid mixture into an expansion chamber coupled to the mixing chamber and expanding the fluid mixture in the expansion chamber of the eductor pump assembly for delivery to a downstream component.

19. The method of delivering a fluid as claimed in claim 18, wherein the step of filling the lock hopper with a treatment material and a motive fluid includes filling a plurality of lock hoppers with a treatment material and a motive fluid, the plurality of lock hoppers configured in parallel arrangement.

20. The method of delivering a fluid as claimed in claim 18, wherein the step of activating a plurality of eductor pump assemblies includes activating a plurality of eductor pump assemblies with each eductor pump assembly coupled to a suction outlet of a lock hopper.

* * * * *